US008879091B2

(12) United States Patent
Scaff

(10) Patent No.: US 8,879,091 B2
(45) Date of Patent: Nov. 4, 2014

(54) APPARATUS AND METHOD FOR METERING, MONITORING AND PROVIDING REAL TIME ENTERPRISE PRINTING INFORMATION

(75) Inventor: Marvin Scaff, Tampa, FL (US)

(73) Assignee: Emerge Print Management, LLC, Tampa, FL (US)

( * ) Notice: Subject to any disclaimer, the term of this patent is extended or adjusted under 35 U.S.C. 154(b) by 1725 days.

(21) Appl. No.: 11/812,019

(22) Filed: Jun. 14, 2007

(65) Prior Publication Data

US 2008/0312944 A1    Dec. 18, 2008

(51) Int. Cl.
*G06F 3/12* (2006.01)
*G06F 15/00* (2006.01)
*G06F 15/16* (2006.01)
*G06Q 10/06* (2012.01)

(52) U.S. Cl.
CPC ..................................... *G06Q 10/06* (2013.01)
USPC ........ 358/1.15; 358/1.13; 358/1.14; 709/201; 709/220; 709/223

(58) Field of Classification Search
None
See application file for complete search history.

(56) References Cited

U.S. PATENT DOCUMENTS

| 7,536,449 B2 * | 5/2009 | Melo et al. ................... 709/220 |
| 8,625,131 B2 * | 1/2014 | Matsugashita ............... 358/1.15 |
| 2002/0054321 A1 * | 5/2002 | Kikuchi ....................... 358/1.15 |
| 2004/0070779 A1 * | 4/2004 | Ferlitsch ..................... 358/1.13 |
| 2004/0252329 A1 * | 12/2004 | Sorenson ..................... 358/1.15 |
| 2005/0097198 A1 * | 5/2005 | Getler et al. ................. 709/223 |
| 2007/0285704 A1 * | 12/2007 | Wu .............................. 358/1.15 |
| 2009/0147299 A1 * | 6/2009 | Tetu ............................. 358/1.15 |

* cited by examiner

*Primary Examiner* — Satwant Singh
(74) *Attorney, Agent, or Firm* — GrayRobinson, P.A.

(57) ABSTRACT

The invention relate to an apparatus and a method for monitoring all printers in an enterprise. The method includes for each transaction, authenticating a customer associated with the enterprise and obtaining a session ticket. The method also includes executing a printer list fetcher for downloading a list of in-service printer and print scan load frequency for each location with in the enterprise and executing a scheduler for implementing different categories of scans. The method further includes executing a network scan on a computer network to obtain information for all printers attached to the computer network, executing a local scan on each computer that is attached to a non-network printer to obtain information for all non-network printers in the enterprise and executing a port scan to obtain information for all non-cataloged printers. The method also includes compiling all scanned information, obtained from executing the network scan, the local scan and the port scan, in a file and dispatching the file to an external server and using the file in the external server to provide printer status information and usages for each printer in the enterprise.

25 Claims, 3 Drawing Sheets

APPARATUS AND METHOD FOR METERING, MONITORING AND PROVIDING REAL TIME ENTERPRISE PRINTING INFORMATION

BACKGROUND OF THE INVENTION

1. Field of the Invention

The present invention relates to an apparatus and method for metering and monitoring printers within an enterprise and for providing real time enterprise printing information.

2. Description of the Related Art

Computer networks in an enterprise/organization typically include computer systems and peripherals, such as printers, connected to the computer systems. Organizations rely on printers for carrying out daily operations. An inoperative printer, due to failure or to the lack of consumable components such as toner, can disrupt operations, and waste time and resources. Thus, organizations often desire to determine the extent of usage of printers to prevent disruptions.

Computer networks typically include network printers that are connected directly to the computer network, such that the network printers may be shared by multiple users. Computer networks may also include multiple non-network printers that are connected to one or more individual computers, such that the non-network printers are used by only the computers to which it is connected. Due to the fact that non-network printers are not directly accessible via the computer network, contemporary methods of usage monitoring over the network are not applicable.

Usage of a printer is typically determined by the page count. Pages can be counted manually by sending service personnel to each printing device to procure the page counts via typical means, such as executing a printer test page. This procedure requires a considerable amount of manpower and is costly. Additionally, this procedure can be inaccurate due to human errors. One contemporary attempt to provide more accuracy in monitoring printer usage employs the counting of power surges at the printer to determine the number of pages printed. This method requires that every printer utilizes a stepper motor to advance sheets of paper during printing. Pulsing of each of the coils of the stepper motor results in pulses in the supply current which is to be detected by a separate detection circuit. The detection circuit is operably connected to both a power supply of the printer and a data collection unit. This method suffers from the drawback of being limited to particular types of printers, as well as, inaccuracies in attempting to detect power surges caused only by the coils of the stepper motor during printing. This method suffers from the further drawback of requiring costly hardware for every printer in order to detect the power surges and transmit data representative of the power surges for calculation of the printer usage.

Additionally, contemporary systems that rely on only print counts, do not account for fluctuations in the use of consumable components, such as ink or toner. Usage of consumable components is typically dependent on the type of print job that has occurred. In environments that perform large print jobs, the necessity to re-print the job because of an inadequate amount of ink, resulting in a poor quality of the print job, can be time consuming and costly. It is undesirable to replace consumable components during busy print times, especially where particular print-jobs are time sensitive. Attempting to estimate consumption of consumable components based upon printer usage is usually inaccurate for the reasons described above. Supplies for such consumable components can take time to procure resulting in further disruptions. However, over-estimates of usage of the consumable component is also costly.

In order to accurately service all of the printers within the enterprise, there is a need to accurately determine the usage of both network and non-network printers. There are currently monitoring systems for monitoring the usage of network printers. However, these systems typically cannot discover non-network printers. While there are also monitoring systems that monitor the usage of non-network printers, these systems have been unable to accurately count prints and monitor printer usage on computers that are attached to two or more non-network printers. For example, if a computer system is attached to non-network printers and the computer executes a print command for multiple duplicate print batches, for example, five copies of a five page document, these systems typically count the number of copies printed for that print command as five pages instead of twenty five pages. These systems also cannot monitor ink usage for non-network printers effectively. Therefore, these systems do not accurately report when ink cartridges need to be changed and/or the amount of ink remaining in a currently used ink cartridge.

In order to successfully provide real time enterprise printing information, there are numerous problems that need to be addressed. Specifically, each of the printers (network and non-network printers) used within the enterprise need to be identified, at any given time, there must be communications with each printer to monitor the printer for availability and usage, usage metrics must be computed in order to understand the system usage, and equipment faults and system errors must be detected and measures must be implemented to correct the detected faults and errors.

What is needed, therefore, is a process for providing reliable and affordable printing services, by assuring that any organization's printing services are always available on demand and by maintaining adequate printing supplies and monitoring for any conditions or failures that can adversely affect the services availability.

SUMMARY

The present invention is directed to a method for monitoring all printers in an enterprise. The method includes for each transaction, authenticating a customer associated with the enterprise and obtaining a session ticket. The method also includes executing a printer list fetcher for downloading a list of in-service printer and print scan load frequency for each location with in the enterprise and executing a scheduler for implementing different categories of scans. The method further includes executing a network scan on a computer network to obtain information for all printers attached to the computer network, executing a local scan on each computer that is attached to a non-network printer to obtain information for all non-network printers in the enterprise and executing a port scan to obtain information for all non-catalogued printers. The method also includes compiling all scanned information, obtained from executing the network scan, the local scan and the port scan, in a file and dispatching the file to an external server and using the file in the external server to provide printer status information and usages for each printer in the enterprise.

Another embodiment of the invention is directed to a monitoring component of a computer network, the monitor being configured to monitor all printers in an enterprise. The monitoring component includes an authentication unit configured to authenticate a customer associated with the enterprise and obtain a session ticket, for each transaction. The monitoring component also includes a printer list fetcher configured to download a list of in-service printer and print scan load frequency for each location with in the enterprise and a scheduler configured to implement different categories of scans. The monitoring component further includes an executing unit configured to execute a network scan on a computer network to obtain information for all printers attached to the computer network, a local scan on each computer that is attached to a non-network printer to obtain information for all non-network printers in the enterprise and a port scan to obtain information for all non-catalogued printers. The monitoring component also includes a complier configured to compile all scanned information, obtained from executing the network scan, the local scan and the port scan, in a file and a dispatcher configured to dispatch the file to an external server. The file in the external server is used to provide printer status information and usages for each printer in the enterprise.

Another embodiment of the invention is directed to an apparatus including an authentication means for authenticating a customer associated with the enterprise and obtain a session ticket, for each transaction. The apparatus also includes executing means for executing a printer list fetcher for downloading a list of in-service printer and print scan load frequency for each location with in the enterprise and executing means for executing a scheduler for implementing different categories of scans. The apparatus further includes executing means for executing a network scan on a computer network to obtain information for all printers attached to the computer network, a local scan on each computer that is attached to a non-network printer to obtain information for all non-network printers in the enterprise and a port scan to obtain information for all non-catalogued printers. The apparatus also includes compiling means for compiling all scanned information, obtained from executing the network scan, the local scan and the port scan, in a file and dispatching the file to an external server and means for using the file in the external server to provide printer status information and usages for each printer in the enterprise.

Another embodiment of the invention is directed to a computer program embodied on a computer readable medium, the computer program including program code for controlling a processor to execute a method for monitoring printer usage and status of all printers in an enterprise. The computer program include authenticating a customer associated with the enterprise and obtain a session ticket, for each transaction. The computer program also includes executing a printer list fetcher for downloading a list of in-service printer and print scan load frequency for each location with in the enterprise and executing a scheduler for implementing different categories of scans. The computer program further includes executing a network scan on a computer network to obtain information for all printers attached to the computer network, a local scan on each computer that is attached to a non-network printer to obtain information for all non-network printers in the enterprise and a port scan to obtain information for all non-catalogued printers. The computer program also includes compiling all scanned information, obtained from executing the network scan, the local scan and the port scan, in a file and dispatching the file to an external server and using the file in the external server to provide printer status information and usages for each printer in the enterprise.

Another embodiment of the invention is directed to a computer network configured to monitor all printers in an enterprise. The computer network includes a server configured to authenticate a customer associated with the enterprise and provide a session ticket, for each transaction. The computer network also includes a monitoring component configured to obtain the session ticket and to transmit a file with scanned results from the computer network to the server where information from the file is used to provide printer status information and usages for each printer in the enterprise. The monitoring component includes a printer list fetcher configured to download a list of in-service printer and print scan load frequency for each location with in the enterprise, a scheduler configured to implement different categories of scans, an executing unit configured to execute a network scan on a computer network to obtain information for all printers attached to the computer network, to execute a local scan on each computer that is attached to a non-network printer to obtain information for all non-network printers in the enterprise and to execute a port scan to obtain information for all non-catalogued printers, a complier configured to compile all scanned information, obtained from executing the network scan, the local scan and the port scan, in the file and a dispatcher configured to dispatch the file to the server.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
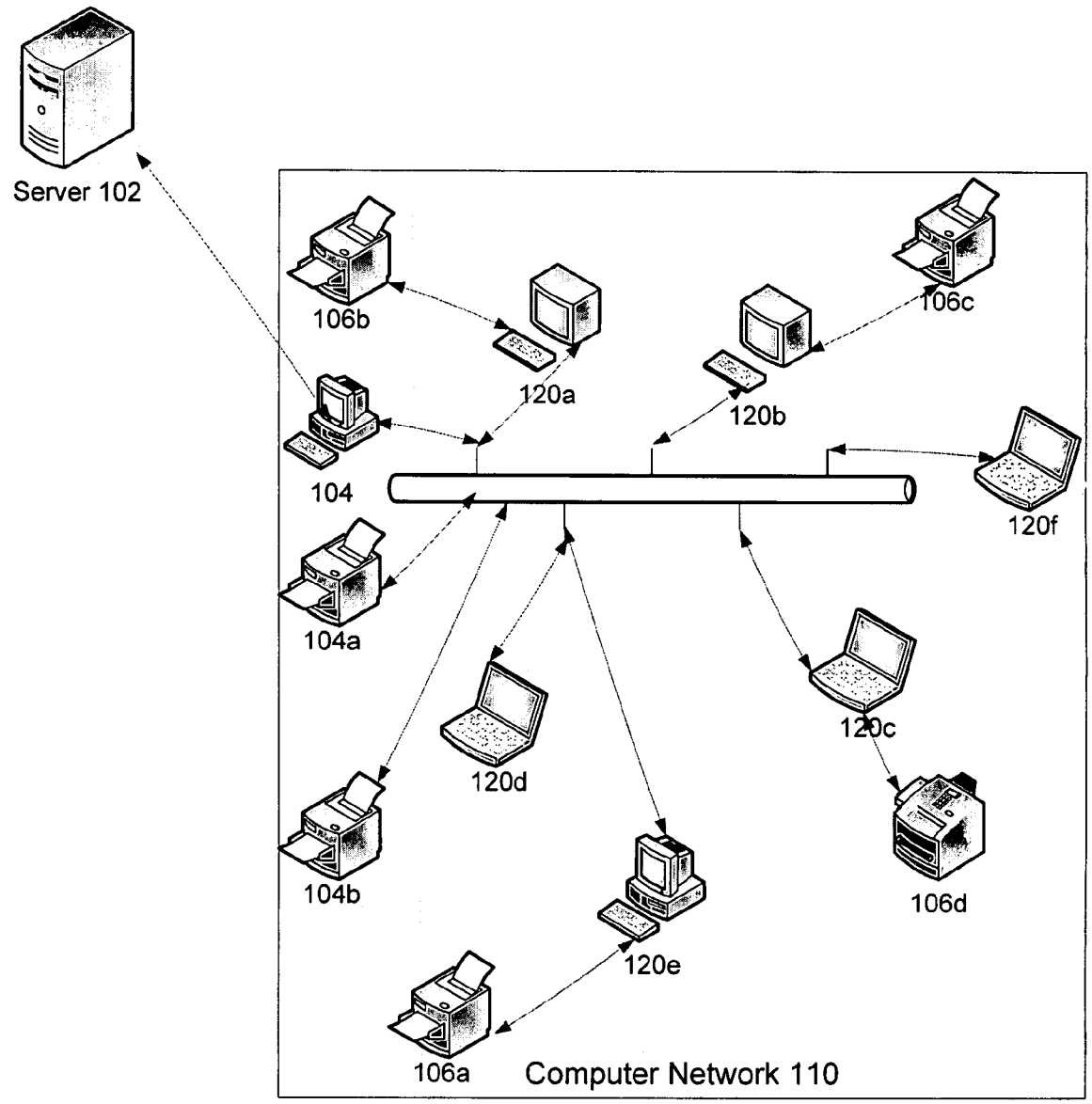
FIG. 1 illustrates an embodiment of a printer scan system with multi-protocol support in which embodiments of the present invention may be implemented.

FIG. 1 illustrates an embodiment of a printer scan system with multi-protocol support in which embodiments of the present invention may be implemented. System 100 includes a server 102 which is connected to a terminal 104, for example through the Internet. Terminal 104 is further connected to a network 110 within an enterprise, in which network and non-network printers are to be monitored.

Computer network 110 includes multiple computers 120, each of which is connected to the computer network by standard computer networking methods. The computer network also includes multiple network printers 104a-104b and multiple non-network printers 106a-106d. Each of the non-network printers is only used by the computer to which it is connected. For example, non-network printer 106a is only used by computer 120e, non-network printer 106b is only used by computer 120a and non-network printer 106c is only used by computer 120b. As is apparent to one of ordinary skill in the art, the configuration of the computer network may be modified and still remain within the scope of the present invention.

In an exemplary embodiment, a system or process is provided that can consolidate printing status information from multiple locations. Reporting of the printing status information can be done in real time, although the present disclosure contemplates utilization of other timing schemes for data transfer, for example, polling. Thus, in the exemplary embodiment of the present invention, detection, consolidation and mitigation of service issues across multiple locations can be accomplished. The exemplary embodiment is capable of monitoring and maintaining both networked and non-networked printers so that the entire organization's printing needs are serviced.

Furthermore, an embodiment of the invention accurately tracks duplicate print batches executed a non-networked printer. The embodiment of the invention also monitors the resources for each of the printers. For example, components used in an embodiment of the invention is capable of determining whether ink cartridges have been replaced or the amount of usage left in the cartridge before replacement is required.

A non-shared desktop printer (NSDP) local agent application is installed on each of the computers, for example 120a, 120b and 120e, that is connected to at least one non-network printers 106. The NSDP local agent application may monitor and maintain multiple non-networked printers 106 connected to a single computer. Specifically, the NSDP local agent application is capable of uniquely identifying each of non-network printers 106. In one embodiment, each of the non-network printers is identified through a combination of make, model and Media Access Control (MAC) address associated with the non-network printer. The present disclosure contemplates the use of other indicia for identification of each of non-network printer.

Figure 2:
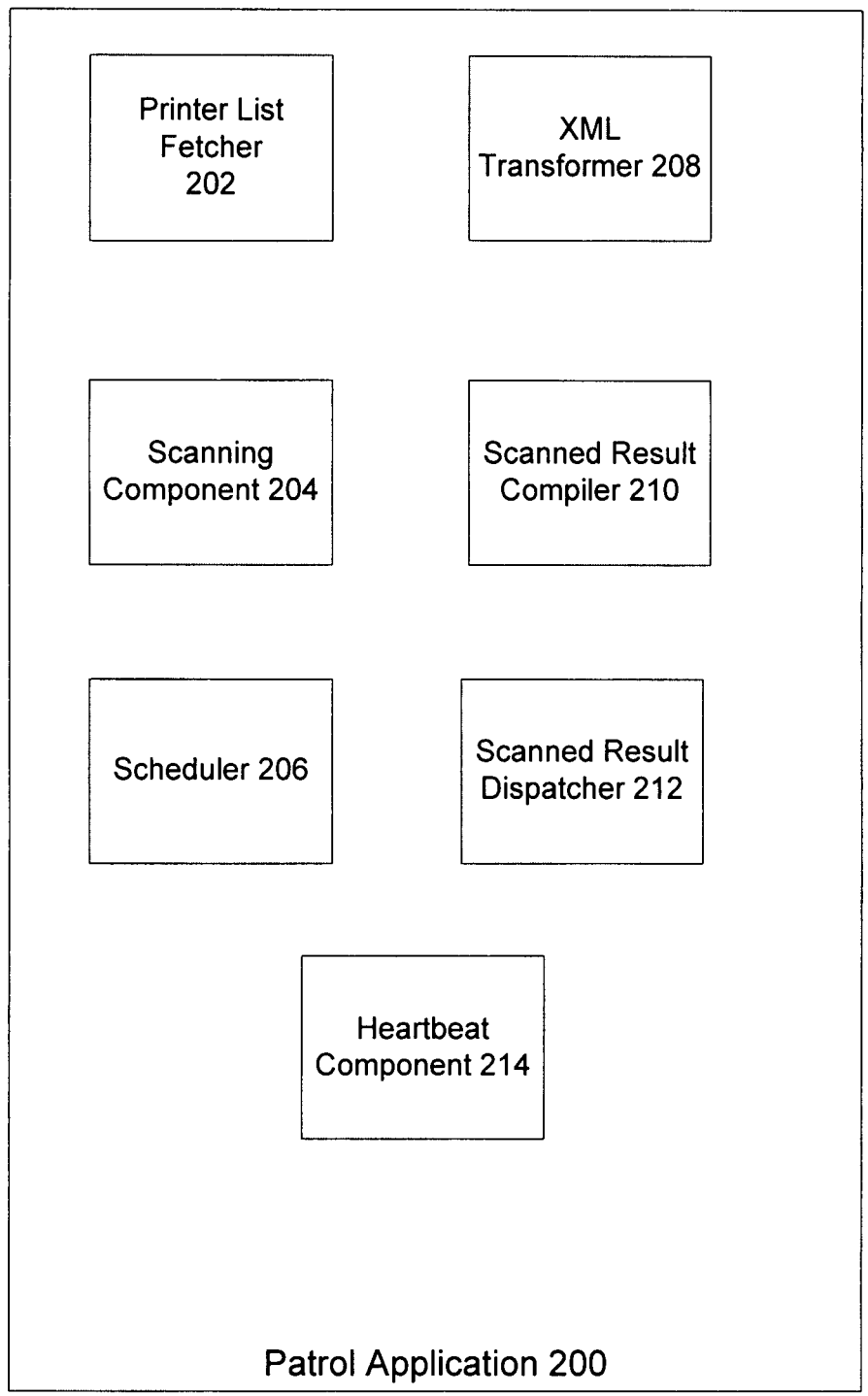
FIG. 2 illustrates an embodiment of the patrol application in which embodiments of the present invention may be implemented.

In order to implement embodiments of the present invention, terminal 104 executes a patrol application which is in communications with one or more application being executed on server 102. FIG. 2 illustrates an embodiment of the patrol application 200 in which embodiments of the present invention are implemented. Patrol application 200 includes a printer list fetcher 202, a scanning component 204, a schedule 206, and XML Transformer 208, a scanned result complier 210, a scanned results dispatcher 212 and a heartbeat sending component 214. Each of the components is discussed in more detail below.

In an embodiment of the invention, patrol application 200 is distributed as Microsoft Software Installer (MSI) file in an all-in-one package, including every dependent component. Patrol application runs as Windows service and can be controlled using Windows services management console. A Windows system tray icon appears when patrol application 200 is being executed. This system tray icon provides a configuration menu item which leads to a configuration wizard. A configuration manager of patrol application 200 includes a meta configuration information module and a graphical user interface (GUI). The meta configuration information module is stored into an XML file which includes server information and a URL of server 102.

An embodiment of patrol application 200 is intended to run continuously without human intervention. Server 102 requires authentication whenever patrol application 200 tries to connect to it. When a new customer is being signed up to use system 100, account information for the new customer is automatically created with server 102. Thereafter, for each transaction with server 102, the customer is authenticated using a preexisting customer password which is stored in the configuration file. An authentication sub-module parses the authentication file using a XML transformer to obtain the customer ID and password. These credentials are then sent out to server 102 using HTTPS client. Server 102 responds with a session ticket, if there is a successful authentication, or with error message, if there is a failure. The session ticket is sent with each request during the session as a proof of authentication.

An embodiment of system 100 is designed to deal with the multiple customer sites, which are physically or logically separately, by implementing a single instance of patrol application 200. Server 102 stores separate preferences for each customer location. These preferences include in-service printers detail and scan frequency, among other information. In-service printers are those printers included in a service contract with the customer. The configuration manager retrieves all active locations associated with the customer. A user of system 100 then selects the locations to be monitored by application 200. The configuration manager saves the preferences for later use. Although the selected locations are scanned with one instance of patrol application 200, separate set of scans is run for each location and scanned results files for each location are uploaded as distinguished scanned results XML files.

An in-service printer profile for the customer may change over time, either due to the additions or deletions of new printers in the customer's enterprise, if the entire enterprise is being serviced by a printer service provider, or due to the additions or deletions of new printers to the contact with the printer service provider, if all of the printers in the customer's enterprise are not being serviced by the printer service provider. Patrol application 200 dynamically monitors these changes with printer list fetcher 202 which downloads a Customer Service Object (CSO) before starting a scheduled printer scan. The CSO includes a list of in-service printers and print scan upload frequency. The CSO is a location based entity. Therefore, a separate CSO for each monitored location is fetched before scanning the location.

System 100 includes a set of schedulers for executing periodic scans with or without human intervention. An embodiment of patrol application 200 includes a custom built scheduler 206 to run different categories of scans after specified intervals. In an embodiment of the invention, patrol application 200 supports separate scan categories, wherein the scan categories are separated on the basis of purpose and all scan categories are configurable at granular level. Specifically, the patrol application executes a printed page scanning category, a printer status report scanning category and a printer add/remove reporting scanning category.

The printed page scanning category is used for determining the printed pages counted for in-service printers. Patrol application 200 retrieves current print count from each printer, that is, both network and non-network printers. These meter reads are sent to server 102 in the form of XML file using HTTPS.

The printer status reporting category scans the status of printers, by observing the status of each in-service printer. Patrol application 200 runs this scan after specified interval of time. This scan retrieves an in-service printers list from server 102 and checks the status of each printer. In an embodiment of the invention, the status check is performed for only events mentioned in the configuration file, for example, low toner and paper jam. If patrol application 200 finds a printer in an error condition, it sends out the status report to server 102. Server 102, in turn, sends out an email to the relevant technician. The notification service is implemented for email notification, but it is extendable to adopt other notification modes, for example, SMS.

The printer add/remove reporting scan is associated with adding a new printer to the service contract or removing an existing printer from the contract. Patrol application 200 detects the addition or removal of printers to or from the network. For this scan, the patrol application traverses the whole network to inspect each IP in an IP range. The list of found printers is matched with the in-service printers list. This comparison provides information about lost or found printers. The list of lost and found printers is sent to server 102.

Patrol application 200 includes a scanning component for performing various types of scans on the network. Specifically, patrol application 200 performs a Simple Network Management Protocol (SNMP) scan, a Non Shared Desktop Printers (NSDP) scan and a Jet Direct scan.

As is known to one skilled in the art, SNMP-enabled printers provide information through an SNMP interface. This information is available as Management Information Base (MIB) objects. Each attribute of a printer is identified by a unique identifier called as Object Identifier (OID). An OID can either have a single value or list of values. There are some standard MIBs and printer vendors are obliged to implement them and provide the corresponding information. Besides standard MIBs, vendors can use extended private MIBs. These MIBs include vendor specific information. Patrol application 200 scans network printers using the SNMP scan. The SNMP scanner looks for SNMP enabled printers at each IP in a provided IP list using a SNMP query.

Patrol application 200 includes two XML files including the OIDs required to be scanned. One of the XML files includes detailed attributes, which contains the OIDs for newly discovered printers, and the other file includes attributes that are required for status reporting and print count scan categories. When the SNMP scanner finds an SNMP printer over an IP, it tries to retrieve OID values based on underlying OID file. The retrieved values are appended to a scanned result XML file using a XML transformer 208 the scanned result XML file is sent out to server 102 using HTTPS client.

XML Transformer 208 transforms the Configuration Plain Java Objects (POJOs), provided by the GUI component, to the XML configuration file. XML transformer 208 also transforms XML configuration file to POJOs for patrol application 200 usage. XML transformer 208 further transforms scanned results from different formats to an XML file which is then sent out to server 102.

Non-network printers are scanned using a NSDP Locator, which compliments a NSDP Monitor. The NSDP Monitor runs on network computers that have non-network printers attached to it. The NSDP Locator searches for each NSDP Monitor over each IP in the list, associated with the in-service printers. When a NSDP Monitor is found, NSDP locator asks for the printer details which are gathered in form of Java objects. The Java objects are transformed to XML using XML transformer 208 and appended to the scanned result file. This file is sent to server 102 using HTTPS client.

Jet Direct printers are scanned using Printer Job Language (PJL) queries. Jet Direct print servers listen at a port, for example port 9001. When a Jet Direct scanner finds a Jet Direct printer at an IP, it creates Java socket with that IP at port 9001. PJL queries are printed to the socket. Server 102 returns query results which are appended to the scanned result file using XML Transformer 208.

Patrol application 200 also includes a can results compiler 210. An embodiment of patrol application 200 is designed to follow the Inbox/Sent Items model for scanned results upload. As noted above, patrol application 200 obtains scanned results from SNMP Printers, Jet Direct Printers and NSDP Printers. Each type of scan sends the scanned information in a different format to patrol application 200. Scan result compiler 210 understand all these formats and is designed to compile all of them using to a single resultant XML file using XML Transformer 208. The scanned result XML file is saved to a outbox folder. A scan result file dispatcher 212 visits the outbox folder and dispatches all present scanned result files to server 102. Scan result file dispatcher 212 is designed so that it leaves the scanned result file in the outbox, if the scanned result file is not successfully sent out. This design aids in error recovery when there is a connectivity error between server 102 and the terminal 104. After a scanned result file is sent out to server 102, it is saved in a sent items folder. Whenever a scanned result file is compiled and copied to the outbox, it triggers the dispatcher component 212 which is responsible for establishing HTTPS connection with server 102. After the HTTPS connection is established, dispatcher component 212 authenticates itself with server 102 using a predefined ID and password, stored in the configuration file. Successful authentication triggers the transfer of the scanned result XML file from patrol application 200 to server 102. A scanned result file is sent as XML string over HTTPS. This XML string is parsed to POJO after reception at server, validated and persisted.

Patrol application 200 also includes a heartbeat sender component 214 which includes a pre-configured daemon that is invoked after a predetermined amount of time, for example every 60 minutes, to send a signal to server 102. If, within a specified time frame, server 102 does not receive three consecutive heartbeat signals from an instance of patrol application 200, it sends an email alert to technician. The alert includes the customer information and the location of patrol instance.

Figure 3:
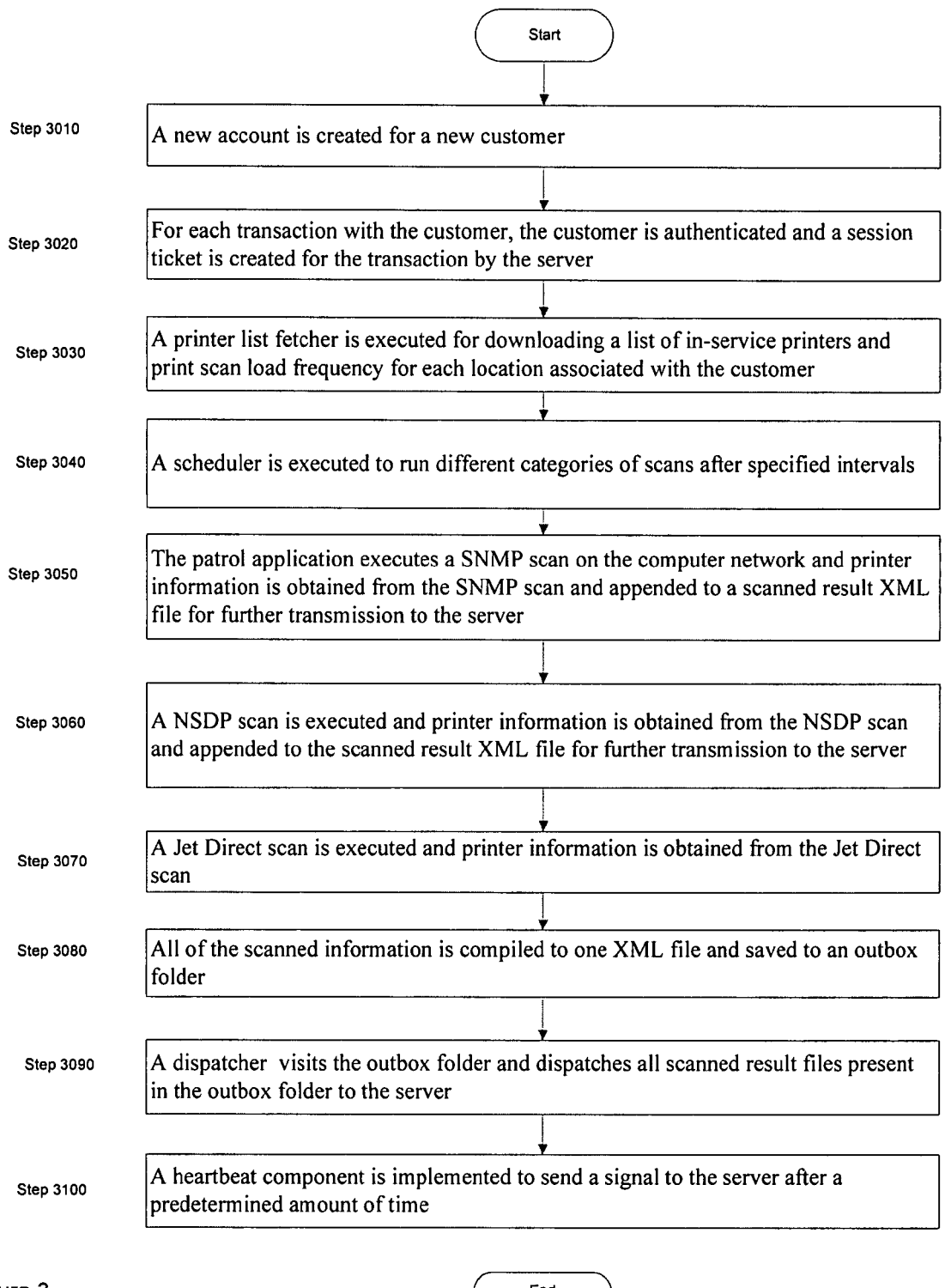
FIG. 3 illustrates the steps implemented in embodiment of the present invention.

FIG. 3 illustrates the steps implemented in embodiment of the present invention. In step 3010, a new account is created for a new customer, wherein information about the customer is stored in a configuration file. In Step 3020, for each transaction with the customer, the customer is authenticated and a session ticket is created for the transaction by server 102. In Step 3030, a printer list fetcher is executed for downloading a list of in-service printers and print scan load frequency for each location associated with the customer. In Step 3040, a scheduler is executed to run different categories of scans after specified intervals. In an embodiment of the invention, patrol application 200 executes a printed page scanning category, a printer status report scanning category and a printer add/remove reporting scanning category. In Step 3050, patrol application 200 executes a SNMP scan on the computer network and printer information is obtained from the SNMP scan and appended to a scanned result XML file for further transmission to server 102. Specifically, the SNMP scan obtains all available IP addresses for each printer attached to the computer and obtains information such as the print count associated with the computer. The SNMP scan enables the discovery application to obtain information for the majority of printers on the network and enables the discover application to obtain complete MIB information on those printers.

In Step 3060, a NSDP scan is executed and printer information is obtained from the NSDP scan and appended to the scanned result XML file for further transmission to server 102. Specifically, the NSDP scan obtains the IP addresses for all NSDP agents and the information provided by the NSDP agent about the printers connected to the NSDP agent. The NSDP scan is enables application 200 to obtain information from the printers that were not discovered in the SNMP scan. Specifically, the NSDP scan enables patrol application 200 to obtain information from non-network printers that are connected to individual computers rather than to the computer network. In Step 3070, a Jet Direct scan is executed and printer information is obtained from the Jet Direct scan. Specifically, the Jet Direct scan sends a query to a specific port, for example port 9001, to obtain information for non-catalogued enterprise printers connected to the client network and appended to the scanned result XML file for further transmission to server 102.

In Step 3080, all of the scanned information is compiled to one XML file and saved to an outbox folder. In Step 3090, dispatcher 212 visits the outbox folder and dispatches all scanned result files present in the outbox folder to server 102. In Step 3100, the heartbeat component 214 is implemented to send a signal to server 102 after a predetermined amount of time.

During the steps implemented in FIG. 3, the present invention accurately counts and monitors computer/printer configurations within an enterprise. It should be appreciated by one skilled in art, that the present invention may be utilized in any computer network configuration where there are non-network and network printers, as described above. The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

What is claimed:

1. A method for monitoring all printers in an enterprise, comprising:
   for each transaction, authenticating a customer associated with the enterprise and obtaining a session ticket from a remote server;
   executing a printer list fetcher for downloading from the remote server a list of in-service printer and print scan load frequency for each location within the enterprise;
   executing a scheduler for implementing different categories of scans;
   executing a network scan on a computer network to obtain information for all printers attached to the computer network, a local scan on each computer that is attached to a non-network printer to obtain information for all non-network printers in the enterprise and a port scan to obtain information for all non-catalogued printers;
   compiling all scanned information, obtained from executing the network scan, the local scan and the port scan, in a file and dispatching the file to an external server; and
   transmitting the file in the external server to a relevant technician to provide printer status information and usage information for each printer in the enterprise.

2. The method of claim 1, wherein the step of compiling all scanned information comprises saving the file in an outbox folder and dispatching the file from the outbox folder to the external server.

3. The method of claim 1, wherein the step of authenticating the customer comprises obtaining a separate preference for each location within the enterprise, wherein a separate scan is implemented for each location and a scanned result file for each location is uploaded to the external server.

4. The method of claim 1, wherein the step of executing the printer list fetcher comprises downloading a customer service object including a list of in-service printers and print scan upload frequency based on each location within the enterprise.

5. The method of claim 1, wherein the step of executing the scheduler comprises executing separate scan categories on the basis of a purpose of each scan category.

6. The method of claim 5, wherein the step of executing separate scan categories comprises executing a printed page scanning category, a printer status report scanning category and a printer addition or removal reporting scanning category.

7. The method of claim 6, wherein the step of executing the printed page scanning category comprises scanning for printed pages counted for in-service printers and transmitting obtained information to the external server.

8. The method of claim 6, wherein the step of executing the printer status report scanning category comprises scanning the status of in-service printers for predefined events.

9. The method of claim 6, wherein the step of executing the printer addition or removal reporting scanning category comprises detecting the addition or removal of printers to or from the network.

10. The method of claim 1, wherein the network scan is a simple network management protocol scan.

11. The method of claim 1, wherein executing the local scan comprises obtaining an internet protocol address for each print monitoring agent and obtaining print status information from each print monitoring agent.

12. The method of claim 1, where executing the port scan comprises sending a query to a specific port to obtain information on non-catalogued printers.

13. A monitoring component of a computer network, the monitor being configured to monitor all printers in an enterprise, the monitor comprising:
    an authentication unit configured to authenticate a customer associated with the enterprise and obtain a session ticket from a remote server, for each transaction;
    a printer list fetcher configured to download from the remote server a list of in-service printer and print scan load frequency for each location with in the enterprise;
    a scheduler configured to implement different categories of scans;
    an executing unit configured to execute a network scan on a computer network to obtain information for all printers attached to the computer network, a local scan on each computer that is attached to a non-network printer to obtain information for all non-network printers in the enterprise and a port scan to obtain information for all non-catalogued printers;
    a complier configured to compile all scanned information, obtained from executing the network scan, the local scan and the port scan, in a file;
    a dispatcher configured to dispatch the file to an external server,
    wherein the file in the external server is transmitted to a relevant technician to provide printer status information and usage information for each printer in the enterprise.

14. The monitoring component of claim 13, wherein the compiler is configured to save the file in an outbox folder for dispatch from the outbox folder to the external server.

15. The monitoring component of claim 13, wherein the authenticating unit is configured to obtain a separate preference for each location within the enterprise, wherein a separate scan is implemented for each location and a scanned result file for each location is uploaded to the external server.

16. The monitoring component of claim 13, wherein the printer list fetcher is configured to download a customer service object including a list of in-service printers and print scan upload frequency based on each location within the enterprise.

17. The monitoring component of claim 13, wherein the scheduler is configured to execute separate scan categories on the basis of a purpose of each scan category.

18. The monitoring component of claim 17, wherein the scheduler is configured to execute a printed page scanning category, a printer status report scanning category and a printer addition or removal reporting scanning category.

19. The monitoring component of claim 18, wherein the scheduler is configured to execute scan for printed pages counted for in-service printers and transmit obtained information to the external server.

20. The monitoring component of claim 18, wherein the scheduler is configured to execute scan the status of in-service printers for predefined events.

21. The monitoring component of claim 18, wherein the scheduler is configured to execute scan for the addition or removal of printers to or from the network.

22. The monitoring component of claim 18, wherein the network scan is a simple network management protocol scan which includes obtaining an internet protocol address and print status information for each printer in the computer network.

23. An apparatus, comprising:
  an authentication module for authenticating a customer associated with the enterprise and obtain a session ticket from a remote server, for each transaction;
  a first executing module for executing a printer list fetcher for downloading from the remote server a list of in-service printer and print scan load frequency for each location with in the enterprise;
  a second executing module for executing a scheduler for implementing different categories of scans;
  a third executing module for executing a network scan on a computer network to obtain information for all printers attached to the computer network, a local scan on each computer that is attached to a non-network printer to obtain information for all non-network printers in the enterprise and a port scan to obtain information for all non-catalogued printers;
  a compiling module for compiling all scanned information, obtained from executing the network scan, the local scan and the port scan, in a file and dispatching the file to an external server; and
  a module configured to transmit the file in the external server to a relevant technician to provide printer status information and usage information for each printer in the enterprise.

24. A computer program embodied on a non-transitory computer readable medium, the computer program comprising program code for controlling a processor to execute a method for monitoring printer usage and status of all printers in an enterprise, comprising:
  authenticating a customer associated with the enterprise and obtaining a session ticket from a remote server, for each transaction;
  executing a printer list fetcher for downloading from the server a list of in-service printer and print scan load frequency for each location with in the enterprise;
  executing a scheduler for implementing different categories of scans;
  executing a network scan on a computer network to obtain information for all printers attached to the computer network, a local scan on each computer that is attached to a non-network printer to obtain information for all non-network printers in the enterprise and a port scan to obtain information for all non-catalogued printers;
  compiling all scanned information, obtained from executing the network scan, the local scan and the port scan, in a file and dispatching the file to an external server; and
  transmitting the file in the external server to a relevant technician to provide printer status information and usage information for each printer in the enterprise.

25. A computer network configured to monitor all printers in an enterprise, comprising:
  a server configured to authenticate a customer associated with the enterprise by communicating with a remote server and provide a session ticket, for each transaction;
  a monitoring component configured to obtain the session ticket and to transmit a file with scanned results from the computer network to the remote server where information from the file is transmitted to a relevant technician to provide printer status information and usage information for each printer in the enterprise, the monitoring component comprises a printer list fetcher configured to download a list of in-service printer and print scan load frequency for each location with in the enterprise, a scheduler configured to implement different categories of scans, an executing unit configured to execute a network scan on a computer network to obtain information for all printers attached to the computer network, to execute a local scan on each computer that is attached to a non-network printer to obtain information for all non-network printers in the enterprise and to execute a port scan to obtain information for all non-catalogued printers, a complier configured to compile all scanned information, obtained from executing the network scan, the local scan and the port scan, in the file; and
  a dispatcher configured to dispatch the file to the server.

\* \* \* \* \*